R. HAMMERLY.
PISTON RING ADJUSTER.
APPLICATION FILED APR. 5, 1919.
1,336,222.
Patented Apr. 6, 1920.
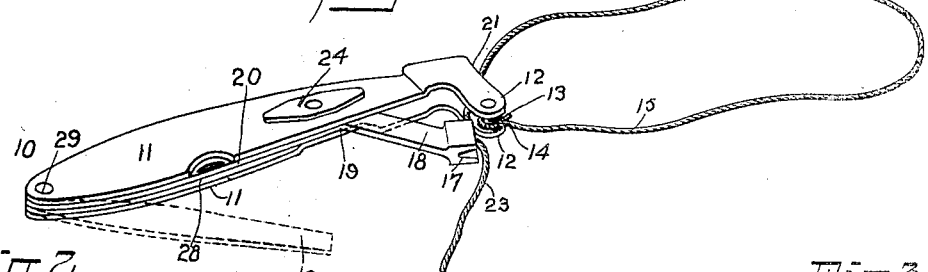
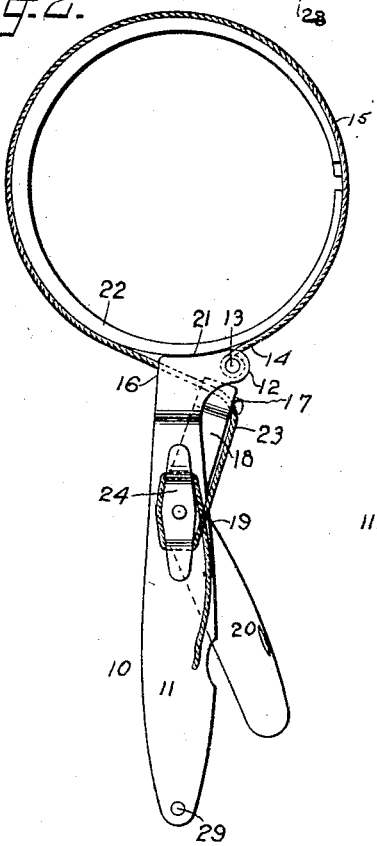
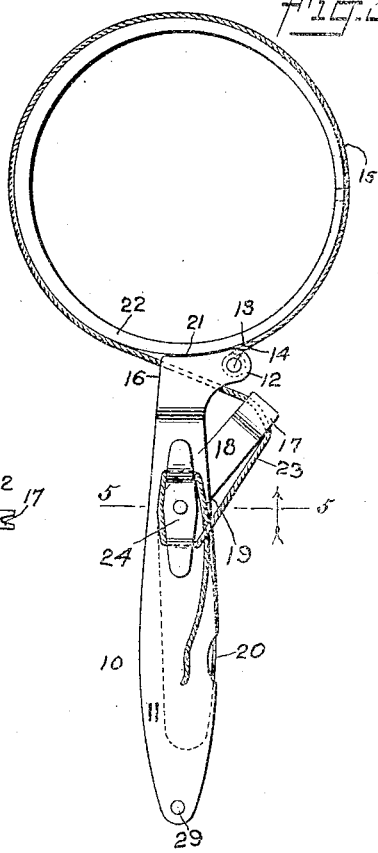
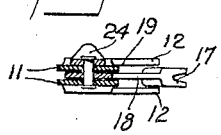
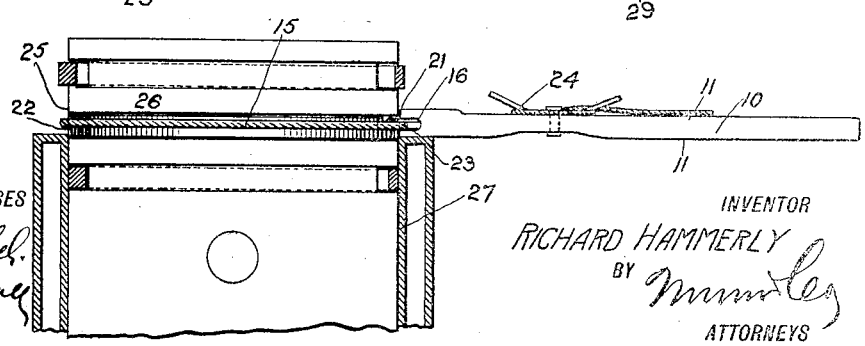
WITNESSES
INVENTOR
RICHARD HAMMERLY
BY
ATTORNEYS

UNITED STATES PATENT OFFICE.

RICHARD HAMMERLY, OF NEW YORK, N. Y.

PISTON-RING ADJUSTER.

1,336,222.  Specification of Letters Patent.  Patented Apr. 6, 1920.

Application filed April 5, 1919. Serial No. 287,774.

*To all whom it may concern:*

Be it known that I, RICHARD HAMMERLY, a citizen of the United States, and a resident of the city of New York, Union Course, borough of Queens, in the county of Queens and State of New York, have invented a new and Improved Piston-Ring Adjuster, of which the following is a full, clear, and exact description.

My invention has for its object to provide a piston ring adjuster which may be used to hold and compress a piston ring into position in a piston ring groove in a piston, the adjuster having a flexible member which slightly compresses the piston ring to hold the latter until it is desired to compress the piston ring further when the lever on the adjuster operates in connection with the flexible member to compress the piston ring in the piston ring groove of a piston so that it may enter the cylinder.

Additional objects of the invention will appear in the following specification in which the preferred form of my invention is described.

In the drawings similar reference characters refer to similar parts in all the views, in which—

Figure 1 is a perspective view illustrating my invention;

Fig. 2 is a view showing the adjuster in use and with the piston ring slightly compressed;

Fig. 3 is a view similar to that shown in Fig. 2 but with the piston ring compressed to enter the cylinder;

Fig. 4 is a fragmentary sectional view illustrating how the adjuster is used to compress the ring at the cylinder; and Fig. 5 is a sectional view on the line 5—5 of Fig. 3.

By referring to the drawings, it will be seen that the adjuster is provided with a handle 10 having sides 11 spaced apart, the sides 11 having elbows 12 extending at one set of ends and which are connected by a stud 13 to which an end 14 of a cord 15 is secured. This cord 15 normally is disposed through an opening 16 in the rear of the handle 10, which is best shown in Fig. 4 of the drawings. The cord is then normally disposed in a slot or recess 17 in an arm 18 of a lever 19 pivoted between the sides 11 of the handle 10. As shown in the drawings the lever 19 is disposed substantially parallel with the handle 10. The other arm 20 of the lever 19 is best shown in Fig. 2 of the drawings.

In using the invention, the end 21 of the handle which includes the elbows 12, is disposed against the piston ring 22, the said end 21 of the handle 10 being preferably curved, so that it will fit the piston ring. The cord 15 is then disposed around the piston ring and the terminal of the cord 23 is disposed in the slotted recess 17 in the lever arm 18. The said lever arm 18 is disposed in the position indicated in Fig. 2 of the drawings. The cord terminal 23 is then pulled taut to slightly compress the piston ring 22, the cord terminal 23 being then fastened to the cleat 24 which is secured to a side of the handle 10. It is then possible to further compress the piston ring 22 by pressing the lever arm between the sides 11 of the handle, as illustrated in Fig. 3 of the drawings.

Of course, the piston ring 22 should first be disposed in the piston ring groove 25 in the piston 26, so that when the cord 15 is disposed around the piston ring 22, the piston ring may be held by the adjuster until the piston ring is disposed at the end of the cylinder 27, when the lever arm 22 is pressed between the sides 11 of the handle 10, as has been stated, to compress the piston ring, as illustrated in Fig. 4 of the drawings, thereby permitting the piston ring to enter the cylinder.

In addition to the lever 19 which is pivoted between the sides 11 of the handle 10, there is preferably disposed between the said handle sides 11 a screw-driver or other tool 28, the said screw-driver or other tool 28 being pivoted at 29.

Having thus described my invention, I claim as new and desire to secure by Letters Patent:

1. In a piston ring adjuster, a handle, a flexible member secured at one end of the handle and extending therefrom in one direction for disposal around a piston ring, means to secure the other end of the flexible member to the handle, and a lever mounted on the handle, the lever having an arm free to move in the said direction beyond the handle and engaging the second mentioned end of the flexible member for pressing the flexible member in the said direction beyond the handle.

2. In a piston ring adjuster, a handle having sides spaced apart, a lever pivoted between the sides of the handle, a cord having an end secured between the sides of the handle and extending therefrom in one direction for disposal around a piston ring, there being an opening in the handle through which the cord is disposed, and a cleat on the handle to which the other end of the cord is normally secured, a lever having an arm free to move in the said direction beyond the handle and engaging the flexible member between its ends for pressing the flexible member in the said direction beyond the handle.

3. In a piston ring adjuster, a handle having a concave terminal to fit a piston ring, a flexible member secured at one end of the terminal and extending in one direction for disposal around a piston ring, there being an opening at the other end of the terminal through which the flexible member is disposed, means to secure the other end of the flexible member to the handle, and a lever mounted on the handle and normally disposed substantially parallel therewith, the lever having an arm engaging the flexible member adjacent the second mentioned end of the flexible member for pressing the flexible member in the said direction, for the purpose specified.

RICHARD HAMMERLY.